(12) United States Patent
Wilbraham

(10) Patent No.: US 8,138,774 B2
(45) Date of Patent: Mar. 20, 2012

(54) METHOD OF DETERMINING THE DIAMETER OF A HOLE IN A WORKPIECE

(75) Inventor: Nigel Wilbraham, Stourbridge (GB)

(73) Assignee: Siemens Aktiengesellschaft, Munich (DE)

( * ) Notice: Subject to any disclaimer, the term of this patent is extended or adjusted under 35 U.S.C. 154(b) by 583 days.

(21) Appl. No.: 12/309,711

(22) PCT Filed: Jul. 25, 2007

(86) PCT No.: PCT/EP2007/005673
§ 371 (c)(1),
(2), (4) Date: Jan. 27, 2009

(87) PCT Pub. No.: WO2008/012330
PCT Pub. Date: Jan. 31, 2008

(65) Prior Publication Data
US 2011/0248726 A1 Oct. 13, 2011

(30) Foreign Application Priority Data

Jul. 28, 2006 (EP) .................................. 06015823.5

(51) Int. Cl.
*G01R 27/08* (2006.01)
*G01R 31/08* (2006.01)

(52) U.S. Cl. ...................................... 324/713; 324/522
(58) Field of Classification Search .................. 324/713, 324/522
See application file for complete search history.

(56) References Cited

U.S. PATENT DOCUMENTS 4,935,700 A 6/1990 Garbini et al.
5,417,545 A * 5/1995 Harrogate ..................... 415/115

FOREIGN PATENT DOCUMENTS

EP 0347739 A2 12/1989
JP 04307305 A 10/1992

* cited by examiner

*Primary Examiner* — Amy He

(57) ABSTRACT

A method of determining the diameter of a hole extending from a surface of an electrically conducting workpiece into or through the workpiece 1 is provided. The hole is defied at the workpiece's surface by an edge of diameter to be determined. For determining the diameter, the workpiece is electrically charged so that discharge occurs at the edges. The discharge current is measured and the diameter of the hole is determined from the measured discharge current.

17 Claims, 3 Drawing Sheets

METHOD OF DETERMINING THE DIAMETER OF A HOLE IN A WORKPIECE

CROSS REFERENCE TO RELATED APPLICATIONS

This application is the US National Stage of International Application No. PCT/EP2007/057673, filed Jul. 25, 2007 and claims the benefit thereof. The International Application claims the benefits of European Patent Office application No. 06015823.5 filed Jul. 28, 2006, both of the applications are incorporated by reference herein in their entirety.

FIELD OF INVENTION

The present invention relates to a method of determining the diameter of a hole extending from a surface of an electrically conducting workpiece into or through the workpiece.

BACKGROUND OF INVENTION

In many technological fields, it is common practice to introduce holes into electrically conductive workpieces, e.g. metallic workpieces, where the diameter of the holes is a critical parameter. This is, in particular, true for gas turbine components such as, e.g., turbine vanes, turbine blades or components of thermal shieldings. In particular, in turbine blades or vanes as well as in shielding elements of a thermal shielding, such holes are often used for blowing cooling air out of the blade, vane or component, respectively. As the correct metering of air flowing through the holes is an important parameter for gas turbine operation, the diameter of the holes introduced into the blades, vanes or components needs to be precisely controlled. However, such a control requires the diameter of the hole to be precisely known.

SUMMARY OF INVENTION

It is therefore an objective of the present invention to provide a method, which allows a precise determination of the diameter of a hole extending from a surface of an electrically conducting workpiece into or through the workpiece.

The mentioned objective is solved by a method of determining the diameter of a hole extending from a surface of an electrically conducting workpiece into or through the workpiece as claimed in independent claims. The depending claims define further developments of the invention.

According to the invention, a method of determinating a diameter of a hole extending from a surface of an electrically conducting workpiece into or through the workpiece is provided. The hole is delimited at the workpiece's surface by an edge of diameter D to be determined. The workpiece is electrically charged so that a discharge occurs at the edge. The discharge current resulting from the discharge is measured and the diameter D of the hole is determined from the measured discharge current.

As the discharge current is proportional to the length of the edge, i.e. the circumference of the hole's cross section, which in turn depends on the hole's diameter D, one can easily determine the diameter of the hole from the measured discharge current. Therefore, through a precise measurement of the discharge current, the diameter can be easily and rapidly determined.

The inventive method can also be used, if a number of holes with the same diameter D extend from the surface of the electrically conducting workpiece into or through the workpiece. In this case, the measured discharge current is divided by the number of holes to establish a discharge current per hole. Then, the diameter D of the holes is determined from the discharge current per hole. This method allows a global measurement instead of a local measurement of discharge current for every single hole. In particular, if the diameters are very small, it might be difficult to measure the discharge current of a single hole locally.

Sometimes, sharp edges not delimiting a hole are present in workpieces. In this case, it is possible to electrically isolate those edges so that the discharge current only emanates from edges delimiting holes. Alternatively, it is also possible not to isolate edges which do not delimit a hole, but to subtract the discharge current emanating from such edges from the measured discharge current before the diameter of the hole or the holes is determined. By this implementation of the inventive method, a step of isolating edges not delimiting a hole can be omitted.

For measuring the discharge current emanating from edges of the workpiece not delimiting a hole, the discharge current emanating from a reference workpiece can be measured before determining the diameter of the at least one hole in the actual workpiece. The reference workpiece is a workpiece such as the workpiece into or through which the holes extend but without the holes. The reference workpiece can, in particular, be the actual workpiece itself before introducing the holes therein. By this, the reference workpiece gives a precise reference value for the discharge current emanating from the edges not delimiting a hole.

The inventive method of determining the diameter of the hole or the holes can be conducted simultaneously with the process of forming the hole or the holes which offers the possibility of building up a control circuit.

At least a first kind of holes and a second kind of holes the diameter D of which is to be determined may be present in the workpiece, where the different kinds of holes differ in their diameters and/or the characteristics of their edges, e.g. due to different formation processes. In this case, a discharge current emanating from edges of the first kind of holes is subtracted from the measured discharge current emanating from the workpiece with the first kind of holes and the second kind of holes before the diameter D of the second kind of holes is determined. In particular, the diameter D of the first kind of holes can be determined in a first measurement before the holes of the second kind of holes are formed in the workpiece. Hence, the discharge current emanating from the first kind of holes is already known from the first measurement when the diameter D of the second holes is determined.

The inventive method is, in particular, suitable for determining the diameter of at least one cooling air hole in a gas turbine components like, e.g. turbine blades, turbine vanes or shielding components, as a workpiece.

BRIEF DESCRIPTION OF THE DRAWINGS

Further features, properties and advantages of the present invention will become clear from the following description of embodiments in conjunction with the accompanying drawings.

DETAILED DESCRIPTION OF INVENTION

Figure 1:
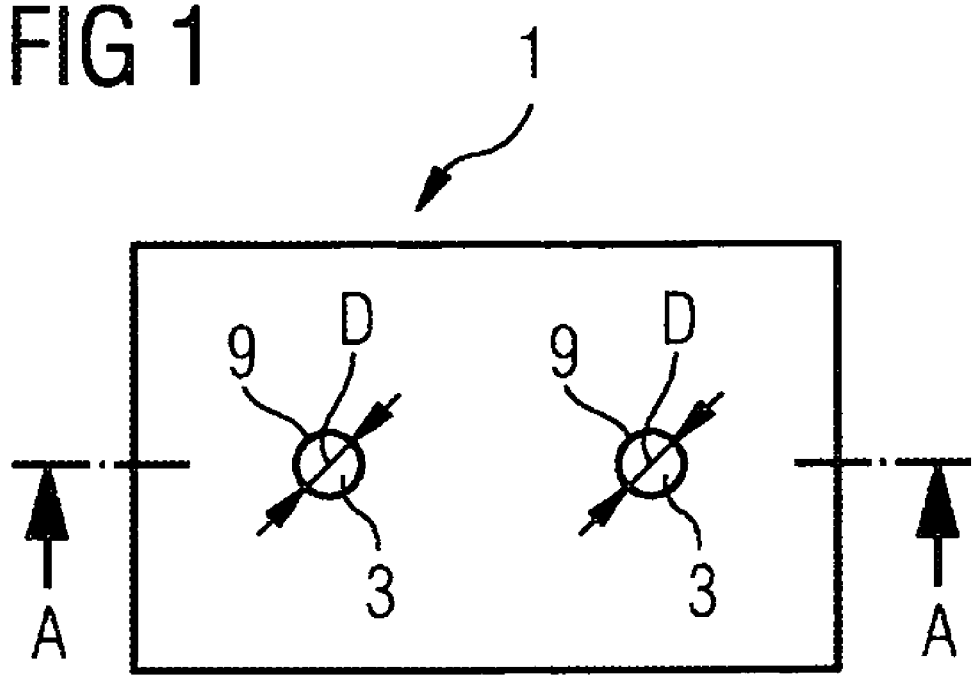
FIG. 1 schematically shows a workpiece with two holes in a top view.

FIG. 1 depicts in a highly schematic view an electrically conducting, e.g. a metallic, workpiece 1 with two holes 3 in a top view.

Figure 2:
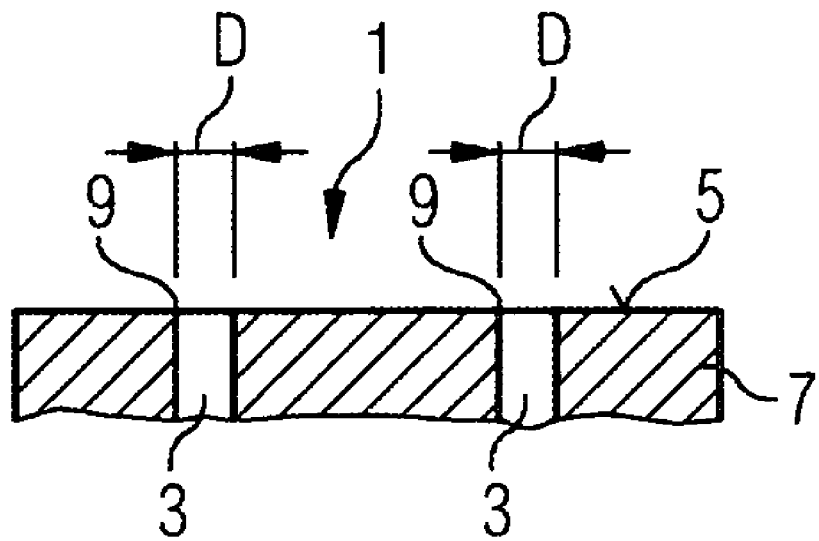
FIG. 2 shows a section through the workpiece depicted in FIG. 1 along the line A-A.

FIG. 2 shows a section through the workpiece along the line A-A. Note, that two holes 3 depicted in the Figure are only exemplary for an arbitrary number of holes of the same diameter. The number of holes can be as low as one. On the other hand, the number of holes can reach a rather high number like 100 or more. The holes 3 have a circular cross section with a diameter D and extend from the surface 5 of the workpiece through a workpiece wall 7. Each hole 3 is delimited in the surface 5 by an edge 9, which is roughly circular and has the same diameter D as the hole's cross section.

The holes may be introduced into the workpiece 1 by any established hole forming method like, e.g. laser cutting, eroding, drilling, etc. If the holes 3, e.g. but not exclusively, represent film cooling openings of turbine components, like turbine vanes or blades, they have to be accurately formed to a given diameter D. Therefore, it is important to control the diameter D of the holes 3.

For determining the diameter D of the holes 3, the workpiece 1 is electrically charged so that a discharge occurs at the edge 9 of the holes 3. The discharge current is measured and the diameter D of the hole is determined from the measured discharge current.

The discharge current is proportional the length of an edge 9 and the number of edges, i.e. the number of holes. As the length of an edge is further proportional to the hole's diameter, the discharge current too will be proportional to the hole's diameter. As a consequence, the measured discharge current represents the length of an edge 9 multiplied by the number of holes. Hence, by dividing the discharge current by the number of holes 3, one gets a signal which is proportional only to the length of an edge 9 of a single hole 3 and, thus, to the diameter D.

A first embodiment of the inventive method will now be described in more detail with respect to FIG. 3. In order to measure the discharge current, an electrode 13 is located near the surface 5 of the electrically conducting workpiece 1. The electrode 13 is electrically connected to a first pole 17 of a power supply unit 15, and the workpiece 1 is electrically connected to the second pole 19 of the power supply unit 15. The voltage supplied by the power supply unit 15 is high enough so that electrons will be discharged from the edges 9, which will then be captured by the electrode 13. By means of this discharge process, an electric circuit is formed by the electrode 13, the power supply 15 and the workpiece 1. The electric current flowing through this circuit is measured by an amperemeter 21. The amperemeter 21 then outputs a signal representing the measured current to a processor unit 23, which determines the diameter D of the holes from the discharge current as described above.

Figure 3:
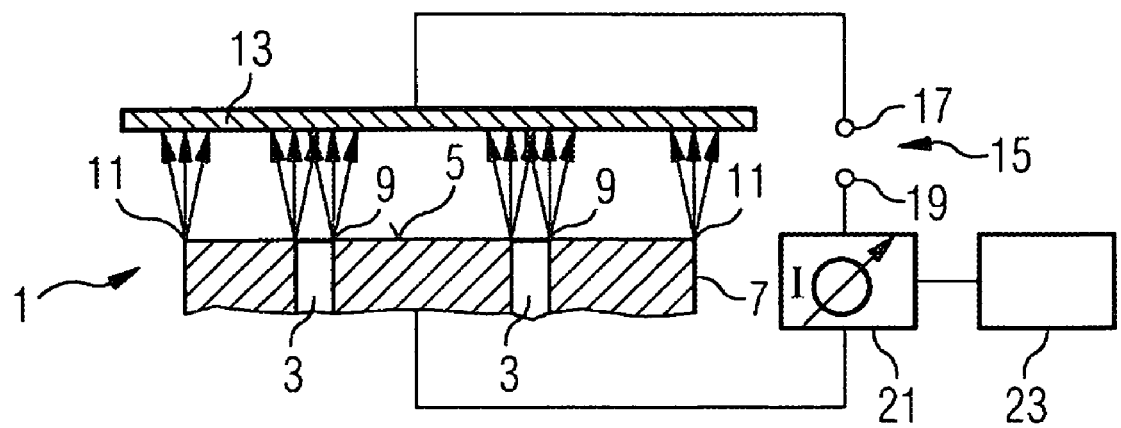
FIG. 3 illustrates a first embodiment of the inventive method with the workpiece of FIG. 1 in a sectional view.

As it is shown in FIG. 3, discharges not only occur at the edges 9 delimiting holes 3 but also at outer edges 11 of the workpiece 1, e.g. at its circumference. The discharge current resulting from such discharges can be taken into account by calibrating the electrical circuit with a workpiece, which corresponds to the workpiece 1 except for the holes 3. With such a reference workpiece, the effect of edges 11 not delimiting holes 3 on the discharge current can be measured before the diameter of the holes 3 is determined. The reference workpiece may be a special workpiece, which is only used for reference issues. However, it may as well be the workpiece 1 itself before the holes 3 are introduced. Then, a reference measurement for determining the reference value would be performed before the holes 3 are introduced into the workpiece 1. The reference value would be stored, e.g. in the processor unit 23, and used when the diameter D of the holes 3 is determined.

Figure 4:
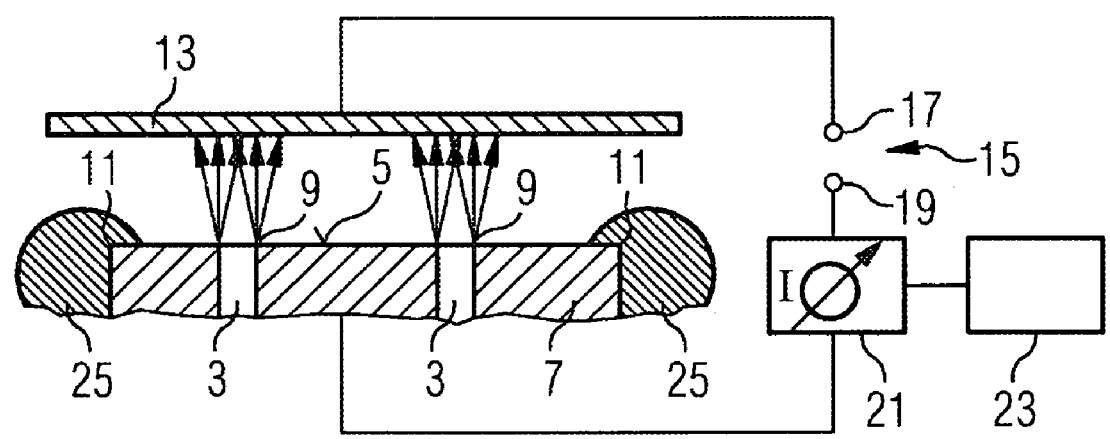
FIG. 4 shows a second embodiment of the inventive method with the workpiece of FIG. 1 in a sectional view.

A second embodiment of the inventive method will be described with reference to FIG. 4. Elements corresponding to elements of the first embodiment will be designated with the same reference numeral and will not be described again.

The second embodiment differs from the first embodiment in that no reference measurement for measuring the effect of the edges 11 not delimiting a hole 3 on the discharge current is necessary. Instead, the outer edges 11 are covered by an isolating material 25 during the determination of the diameter D of the holes 3. Then, the discharge current only represents discharges from edges 9 delimiting a hole 3.

Figure 5:
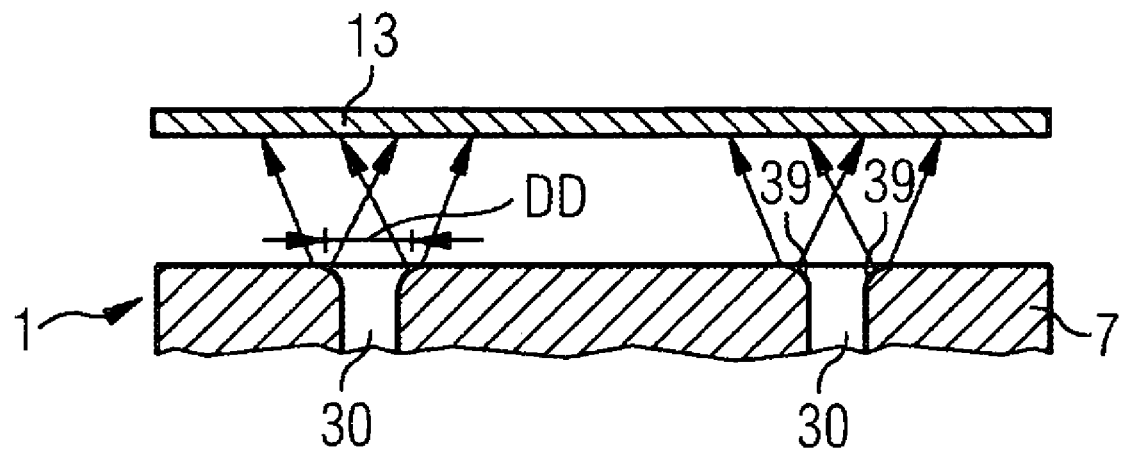
FIG. 5 shows a first step of a modification of the inventive method.

An modification of the method described hitherto will now be described with respect to FIGS. 5 and 6. In FIG. 5 a first kind of holes 30 is present in the workpiece 1. The edges 39 of the first kind of holes 30 are rounded, e.g. due to the process which has been used for forming the first kind of holes.

In a first step of the modified method, the diameter DD of the first kind of holes 30 is determined by the method described with respect to FIGS. 1 to 4. Then, a second kind of holes 3 having an edge characteristics which is different to the edge characteristics of the first kind of holes 30 is formed in the workpiece 1. The difference in the edge characteristics can, e.g., result from different processes used for forming the different kinds of holes 3, 30. The difference in the edge characteristics results in different discharge currents emanating from the edges 9, 39.

Figure 6:
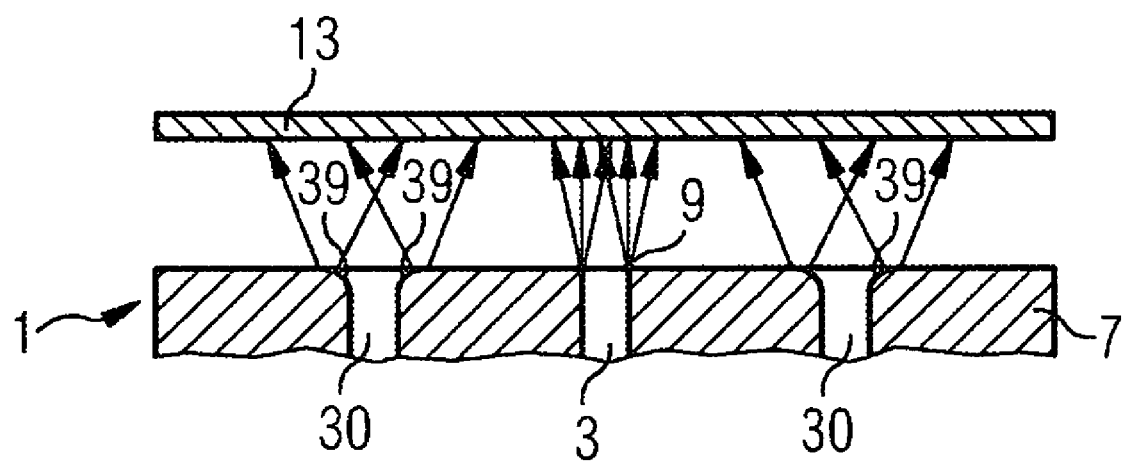
FIG. 6 shows a second step of the modification of the inventive method.

In a second step, the diameter D of the second kind of holes 3 is determined (FIG. 6). To do so, the discharge current emanating from the edges 9, 39 of all holes 3, 30 is determined, and the discharge current emanating from edges 39 of the first kind of holes 30, which was measured in the first step of the modified method, is subtracted from the discharge current measured in the second step. After the subtraction, the diameter D of the second kind of holes is determined from the resulting discharge current.

The workpiece depicted in FIGS. 1 to 4 may, in particular, represent a turbine component, more specifically a gas turbine component, such as a turbine vane, a turbine blade or a heat shield element. The holes 3 could then represent e.g. film cooling holes in such components. The inventive method would later ensure the correct metering of air flowing through the film cooling openings by exactly controlling the diameter D of the holes. However, not only film cooling holes need to be manufactured precisely. Therefore, the inventive method is not restricted to use in connection with manufacturing film cooling holes in turbine components. One could, e.g., also think of injection nozzle openings in burners, e.g. gas turbine burners or internal combustion engines.

For all possible applications, the inventive method provides a means for exactly determining the diameter of a hole in a workpiece in a simple way.

The invention claimed is:

1. A method of determining the diameter of a hole extending from a surface of an electrically conducting workpiece into or through the workpiece, the hole being delimited at the workpiece's surface by an edge of diameter to be determined, comprising:

electrically charging the workpiece so that a discharge current occurs at the edge;
measuring the discharge current; and
determining the diameter of the hole from the measured discharge current.

2. The method as claimed in claim 1,
wherein when a number of holes having the same diameter extend from the surface of the electrically conductive workpiece into or through the workpiece the method further comprising:
dividing the measured discharge current by the number of holes to establish a discharge current per hole; and
determining the diameter D of the hole from the discharge current per hole.

3. The method as claimed in claim 2, further comprising electrically isolating edges of the workpiece not delimiting a hole before determining the diameter of the number of holes.

4. The method as claimed in claim 2, further comprising subtracting a discharge current emanating from edges of the workpiece not delimiting a hole from the measured discharge current before the determining the diameter of the hole or holes.

5. The method as claimed in claim 4, wherein the measuring the discharge current emanating from edges of the workpiece not delimiting a hole includes measuring the discharge current emanating from a reference workpiece without the hole or holes before the determining the diameter.

6. The method as claimed in claim 5, wherein the actual workpiece is used as the reference workpiece before introducing the hole or holes therein.

7. The method as claimed in claim 2, wherein determining the diameter of the holes is conducted simultaneously with a process of forming the holes.

8. The method as claimed in claim 2,
wherein the workpeice includes a further hole extending from the surface of the workpiece into or through the workpiece,
wherein further hole has a further diameter, and
wherein the hole and the further whole differing in diameters and/or an edge characteristic, and wherein a discharge current emanating from edges of the hole is subtracted from the measured discharge current emanating from the workpiece with the hole and the further holes before the diameter of the further hole is determined.

9. The method as claimed in claim 8, wherein the diameter of the hole is determined before the further hole is formed.

10. The method as claimed in claim 2, wherein the diameter of cooling air holes in a gas turbine component as workpiece is determined.

11. The method as claimed in claim 1, further comprising electrically isolating edges of the workpiece not delimiting a hole before determining the diameter of the hole.

12. Method as claimed in claim 1, wherein an electrode is moved near to the surface of the workpiece for measuring the discharge current.

13. The method as claimed in claim 1, further comprising subtracting a discharge current emanating from edges of the workpiece not delimiting a hole from the measured discharge current before the determining the diameter of the hole.

14. The method as claimed in claim 1, wherein determining the diameter of the hole is conducted simultaneously with a process of forming the hole.

15. The method as claimed in claim 1,
wherein the workpeice includes a further hole extending from the surface of the workpiece into or through the workpiece,
wherein further hole has a further diameter, and
wherein the hole and the further whole differing in diameters and/or an edge characteristic, and wherein a discharge current emanating from edges of the hole is subtracted from the measured discharge current emanating from the workpiece with the hole and the further holes before the diameter of the further hole is determined.

16. The method as claimed in claim 15, wherein the diameter of the hole is determined before the further hole is formed.

17. The method as claimed in claim 1, wherein the diameter of a cooling air hole in a gas turbine component as workpiece is determined.

\* \* \* \* \*